United States Patent [19]

Fisch et al.

[11] Patent Number: 5,535,345
[45] Date of Patent: Jul. 9, 1996

[54] METHOD AND APPARATUS FOR SEQUENCING MISALIGNED EXTERNAL BUS TRANSACTIONS IN WHICH THE ORDER OF COMPLETION OF CORRESPONDING SPLIT TRANSACTION REQUESTS IS GUARANTEED

[75] Inventors: Matthew A. Fisch; James M. Brayton, both of Beaverton; Ajay Malhotra, Portland, all of Oreg.

[73] Assignee: Intel Corporation, Santa Clara, Calif.

[21] Appl. No.: 241,964

[22] Filed: May 12, 1994

[51] Int. Cl.$^6$ .................................................. H01J 13/00
[52] U.S. Cl. ............................................. 395/309; 395/288
[58] Field of Search ..................................... 395/287, 292, 395/288, 308, 307, 467, 436, 309, 306

[56] References Cited

U.S. PATENT DOCUMENTS

| | | | |
|---|---|---|---|
| 4,785,394 | 11/1988 | Fischer | 364/DIG. 1 |
| 4,860,198 | 8/1989 | Takenaka | 364/DIG. 1 |
| 5,191,649 | 3/1993 | Cadambi et al. | 395/200 |
| 5,297,242 | 3/1994 | Miki | 395/425 |
| 5,333,296 | 7/1994 | Bouchard et al. | 395/425 |
| 5,345,569 | 9/1994 | Tran | 395/375 |

OTHER PUBLICATIONS

"The Metaflow Architecture", pp. 10–13 and 63–73, by Val Popescu, Merle Schultz, John Spracklen, Gary Gibson, Bruce Lightner, and David Isaman, IEEE Micro, 1991.

*Primary Examiner*—Jack B. Harvey
*Assistant Examiner*—Xuong M. Chung-Trans
*Attorney, Agent, or Firm*—Blakely, Sokoloff, Taylor & Zafman

[57] ABSTRACT

In accordance with the preferred embodiment of the present invention, a bus interface unit of a microprocessor is provided with a Micro Request Sequencer (EBMRS) disposed between a bus scheduling queue (EBBQ) and external bus control logic (EBCTL). Under normal bus request traffic, the EBMRS is effectively transparent and allows normal communication between the EBCTL and the EBBQ. However, for misaligned bus transactions, which comprise memory accesses that cross a bus width boundary, the EBMRS intercepts such transactions for special sequencing, while blocking any further requests from the EBBQ. The EBMRS separates each misaligned bus transaction request into at least first and second split transaction requests, with each split request forming a memory access that does not cross a data bus width boundary of the external bus. It then issues the first split request to the EBCTL for processing on the external bus. External bus agents involved with processing of the split requests then return first response information regarding the completion of the first split request. If the first response information indicates that the first split request will complete without being deferred or retried, the EBMRS issues the second split request to the EBCTL for processing on the external bus. Upon the receipt of second response information for the second split request indicating that the second split request is guaranteed to complete without being deferred or retried, the EBMRS then issues any further transaction requests received from the EBBQ without jeopardizing the order dependency of the split requests or subsequent bus transaction requests buffered in the EBBQ.

20 Claims, 5 Drawing Sheets

METHOD AND APPARATUS FOR SEQUENCING MISALIGNED EXTERNAL BUS TRANSACTIONS IN WHICH THE ORDER OF COMPLETION OF CORRESPONDING SPLIT TRANSACTION REQUESTS IS GUARANTEED

BACKGROUND OF THE INVENTION

1. Field of the Invention

This invention relates to data communications in a computer system, and more specifically, to sequencing misaligned memory accesses forming misaligned bus transactions between a microprocessor and an external bus.

2. Art Background

In several conventional bus architectures, data transactions between the microprocessor and an external bus are permitted to start at any memory address with no alignment restrictions. This may result in requests issued to the external bus for memory accesses being split across at least two data bus width boundaries (i.e. each data bus being 8 bytes wide). Since the bus protocols for such microprocessors define a cache line data chunk return ordering which is not sequential with respect to the memory addresses (i.e., 8 bytes long), these processors must be able to sequence a misaligned memory access as two separate bus transactions in order to be compatible with the protocol of the external bus.

Conventional bus architectures have implemented sequencers for handling misaligned bus transactions. These sequencers take the original external bus request for the misaligned transaction issued by the microprocessor and split them into multiple requests, each of which represent a single transaction on the external bus that is within its data bus boundary width. Nonetheless, when an error occurs in processing of one of the split requests, the entire, original bus request must be canceled since no mechanism exists in such architectures for maintaining the ordering of the completion of the split requests so that a failed split request can be retried and completed in the order of its issuance.

This problem becomes even more significant for bus architectures and protocols in which the bus requests are to be issued and completed in-order on the external bus. This is because a misaligned bus transaction which must be canceled and reissued due to an error in processing of one of the split requests will cause a delay in the completion of other pending bus transactions that were issued subsequent to the canceled transaction, thereby resulting in a substantial performance penalty to the microprocessor.

Accordingly, it is an object of the present invention to provide an external bus micro-request sequencer for sequencing misaligned bus transactions comprising separate split requests in which the order of completion of the corresponding split requests is guaranteed.

It is another object of the present invention to provide a method and apparatus for sequencing misaligned bus transactions in a pipelined bus protocol wherein cancellation of the entire transaction due to an error in its corresponding split requests is avoided by preventing subsequent split and non-split requests from being serviced until the erred split request is guaranteed to complete.

SUMMARY OF THE INVENTION

The present invention provides a method and apparatus for sequencing the split requests of a misaligned external bus transaction in which the order of completion of the corresponding split requests is guaranteed. In accordance with the preferred embodiment of the present invention, a bus interface unit is provided having a Micro Request Sequencer (EBMRS) disposed between a bus scheduling queue (EBBQ) and external bus control logic (EBCTL). Under normal bus request traffic (cache lines and aligned partial requests), the EBMRS is effectively transparent and allows normal communication between the EBCTL and the EBBQ.

However, for misaligned bus transactions, which comprise memory accesses that cross a bus width boundary, the EBMRS intercepts such transactions for special sequencing, while blocking any further requests from the EBBQ to the EBCTL for service. The original misaligned bus transaction is separated by the EBMRS into two "split" requests, which are then sequenced onto the external bus in order. During the sequencing, the EBMRS acts as a liaison between the EBCTL and the EBBQ so that all communication between them appears as if there were no split transactions in the system. Accordingly, the EBBQ submits single bus transactions as they arrive from the memory system, while the EBCTL sees only single directly mappable (split and non-split) transaction requests being issued from the EBMRS.

Split sequencing begins when the EBCTL accepts the first of two split requests issued from the EBMRS. The EBCTL treats the split request as a normal transaction, but the EBMRS waits to issue the second split request until the first split request is guaranteed to complete without being deferred or retried. After the request has been issued onto the bus by the EBCTL, the bus agents coupled to the external bus report back response information indicating whether the outstanding split request will be completed immediately, will be deferred without being retried due to a resource constraint or will simply have to be retried at a later time because of an error condition. This information is sampled by the EBCTL during the snoop phase of the transaction, and a global observation signal is generated and transmitted to the EBMRS when the response information indicates that the split request is guaranteed to complete in-order with respect to other previously issued bus transaction requests.

Upon receiving the global observation signal from the EBCTL, the EBMRS issues the second split request to the EBCTL for processing on the external bus since it is now known that completion the first split request will precede completion of the second split request. When global observation is reported to the EBMRS for the second split request, the EBMRS then accepts the next external bus transaction from the EBBQ and issues that request to the EBCTL in the normal fashion assuming it is not misaligned. In this manner, the reporting of global observation to the EBMRS is utilized to determine when immediate completion of both the first and second split requests is guaranteed so that issuance of the second split request or a subsequent transaction, respectfully, can be performed without jeopardizing the order dependency of the transactions.

In addition, the present invention also permits the sequencing of split requests for a misaligned bus transaction within a sequence of locked bus transactions. In the processing of special transactions on the external bus, such as read-modify-write transactions, the bus must be locked (i.e. exclusive ownership retained by the microprocessor) in order to permit strict sequencing of the locked bus transactions. To accomplish this, the present invention modifies the split sequencing described above so that upon receipt of a misaligned bus lock transaction or a misaligned bus unlock transaction, the EBMRS is able to perform split sequencing of the transaction while instructing the EBCTL when to lock the bus and when to unlock the bus so as to maintain system compatibility.

DETAILED DESCRIPTION OF THE INVENTION

The present invention provides an external bus micro-request sequencer for sequencing the split requests of a misaligned external bus transaction in which the order of completion of the corresponding split requests is guaranteed. For purposes of explanation, specific embodiments are set forth in detail to provide a thorough understanding of the present invention. However, it will be apparent to one skilled in the art that the present invention may be practiced with other embodiments and without all the specific details set forth. In other instances, well known architectural elements, devices, circuits, process steps and the like are not set forth in detail in order to avoid unnecessarily obscuring the present invention.

I. Microprocessor Block Diagram

Figure 1:
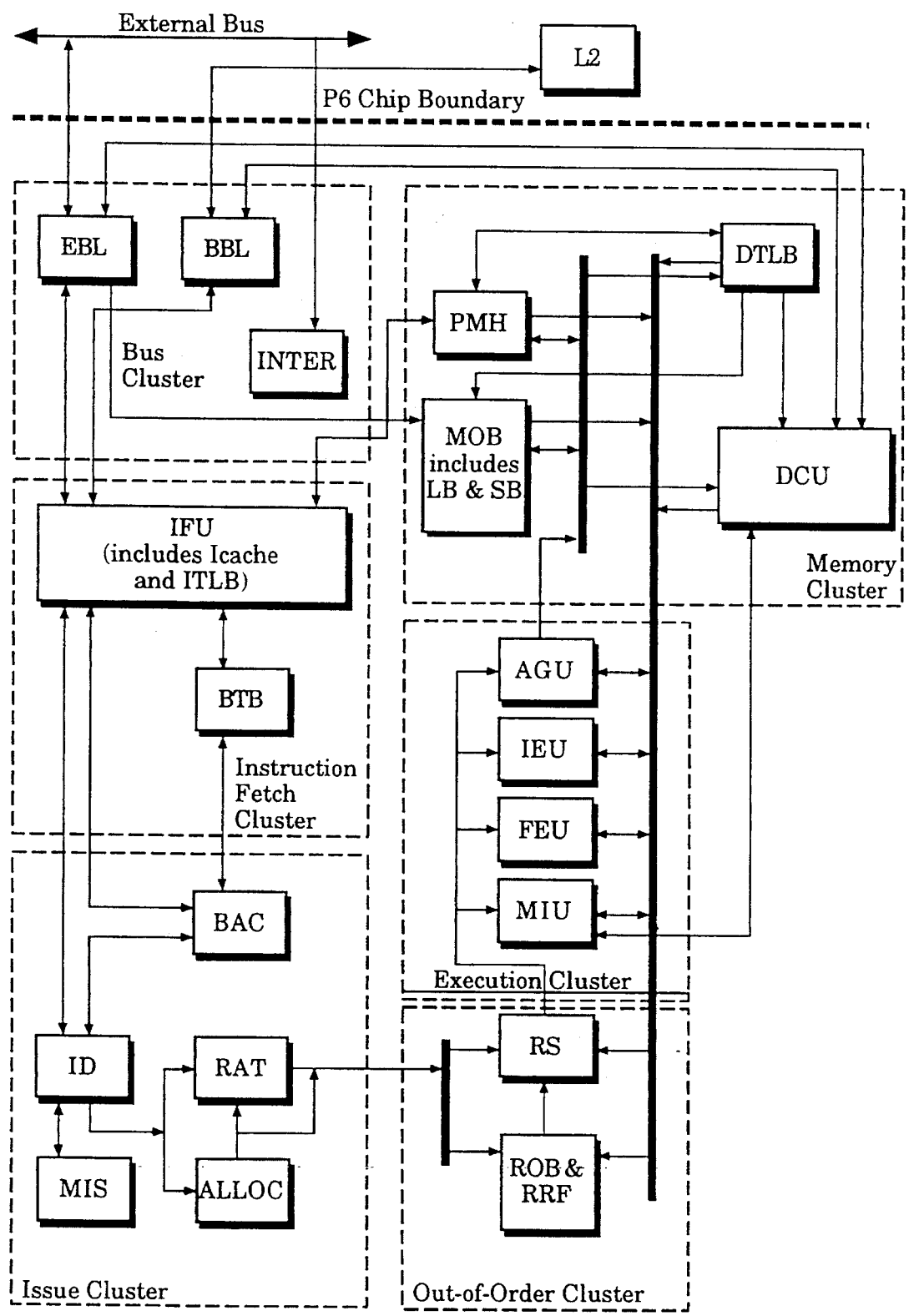
FIG. 1 is generalized block diagram of one embodiment of the microprocessor in which the present invention is utilized.

FIG. 1 is a generalized block diagram of one embodiment of a pipelined, speculative, out-of-order processor in which the external bus micro-request sequencer (EBMRS) of the present invention is preferably utilized. This particular embodiment includes a variety of functional units grouped together in clusters forming a bus cluster, an instruction fetch cluster, an issue cluster, an out-of-order cluster, an execution cluster and a memory cluster. More specifically, the functional units of this microprocessor comprise an instruction fetch unit (IFU), a branch target buffer (BTB), and instruction decoder (ID), a microinstruction sequencer (MS), an allocator (ALLOC), a register alias table (RAT), a reservation station (RS), a number of execution units (IEU, FEU, MIU), a reorder buffer (ROB) and a real register file (RRF).

Each instruction is decoded into one or more microinstructions or micro-operations (uops) by the ID with the help of the MS. The MS provides at least one microcode sequence in response to a corresponding microinstruction pointer (uip) that points to the first instruction in the sequence. The MS also implements special microcode sequences for handling events including exceptions and assists, and in one embodiment, emulates the handling routines used by the Intel microprocessor architecture.

The ID transfers the stream of uops to the RAT and the ALLOC. In one embodiment, the ID issues up to three in-order uops during each clock cycle of the processor. The ALLOC assigns each incoming uop a location in the ROB in the same order as it was received from the ID, thereby mapping a logical destination address (LDST) of each uop to a corresponding physical destination address (PDST) of the ROB. The ALLOC maintains an allocation pointer pointing to the next ROB entry to be allocated. The ALLOC also receives a retirement pointer from the RCC, indicating which uops stored in the ROB are to be committed to architectural state in the RRF. Based upon the received retirement pointer, the ALLOC deallocates retired PDST entries of the ROB to make them available for reallocation.

The RAT maintains the mapping between LDST's and PDST's. To account for retirement, the RAT stores a real register file valid bit that indicates whether the value indicated by the LDST is to be found at the PDST entry of the ROB or in the RRF after retirement. Based upon this mapping, the RAT also associates every logical source address to a corresponding PDST entry of the ROB or the RRF (the source operand of one instruction generally must have been the destination of a previous instruction).

Each incoming uop is also assigned and written into an entry in the RS by the ALLOC. The RS assembles the uops awaiting execution by an appropriate execution unit (EU). When all the source operands of a uop are available and the appropriate EU (specified by an opcode) is ready, the uop is dispatched from the RS to the EU for execution. The EU then writes back result data and any appropriate flags via a writeback bus into the ROB at the entry indicated by the PDST of the dispatched uop. The EU also writes back into the PDST entry of the ROB event information which indicates whether an event has occurred, and if so, the type and specific nature of the event.

The ROB is implemented as a circular buffer that stores the speculatively executed results of micro instructions written back from the EU's. Once execution has completed and the result data of the uops are determined to be no longer speculative, the uops and their results are committed to architectural state in a process referred to as retirement. Uops stored in the ROB are retired in original program order into the RRF according to a retirement pointer. The retirement pointer is maintained in a retirement control circuit and points to all uops for which the processor has determined that the predicted instruction flow is correct. However, for uops which have caused an event, such uops will not be retired from the ROB when a microcode handler must be invoked in order to handle the event.

II. The External Bus Logic (EBL)

Figure 2:
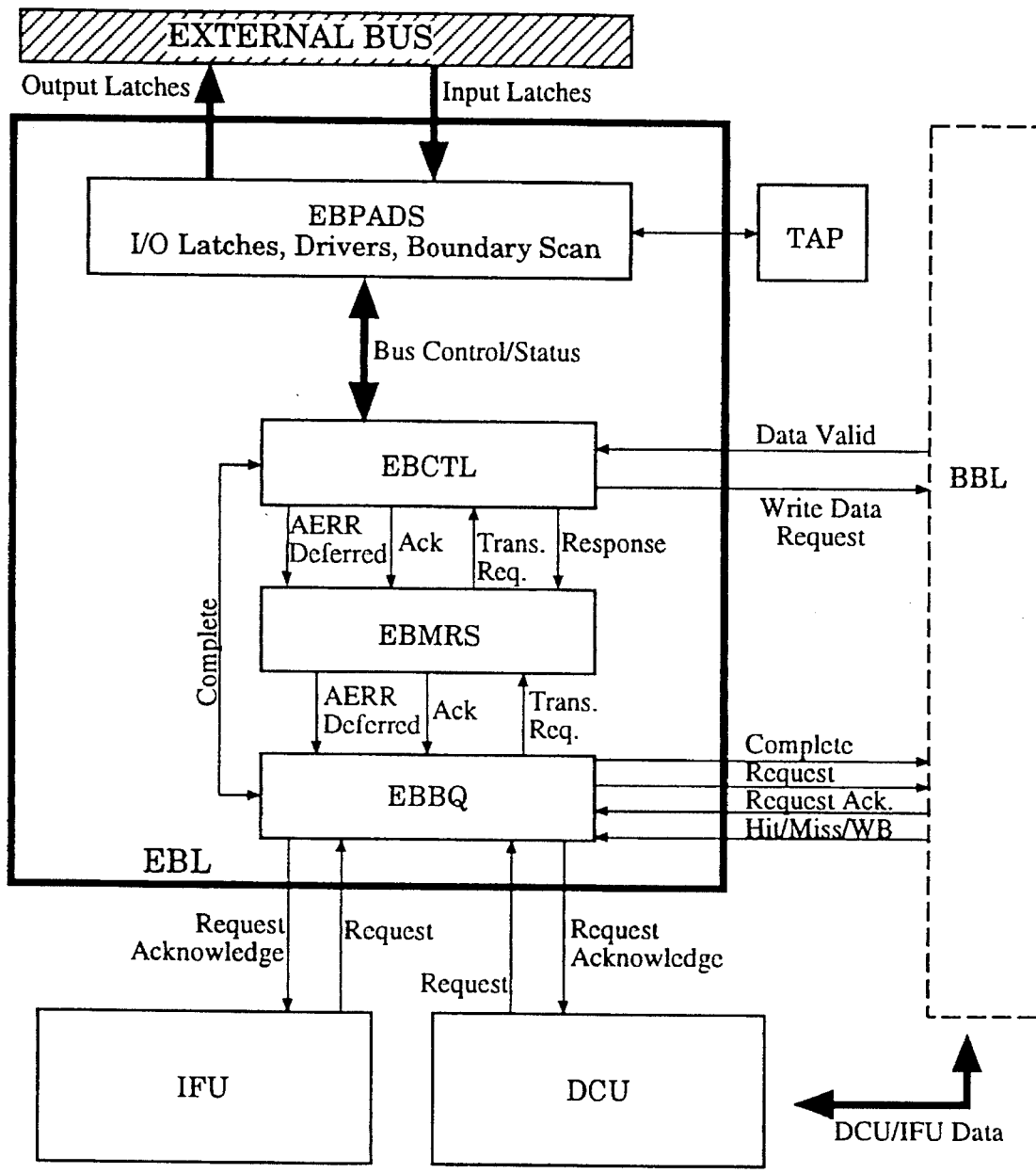
FIG. 2 is a block diagram of the external bus logic and its interconnections to the external bus and various functional units of the microprocessor shown in FIG. 1.

As shown in FIG. 2, the external bus logic (EBL) provides the physical and logical interface between the microprocessor (or a plurality of such microprocessors) and the external bus so as to enable external bus transactions requested by the microprocessor(s) to take place. The EBL also acts as a control interface between a level one data cache trait (DCU) and both the external bus and a level two (external) data cache unit (L2) via a backside bus logic unit (BBL). When a request for a cache access to the DCU fails to produce the required data, the EBL redirects the request to the L2 external cache via the BBL, and if another cache miss occurs, it then redirects the request to memory via the external bus.

To clarify terminology, a "transaction" is the set of bus activity that is related to a single bus memory access request. A transaction begins with bus arbitration, and the assertion of a signal ADS# along with a transaction address. Transactions are issued to transfer data to inquire about or change cache states and/or to provide the system with information. A transaction contains up to six phases, with each phase using a specific set of signals to communicate particular information. However, not all transactions contain all phases, and some phases can be overlapped. The six phases of the bus protocol according to the preferred embodiment of the present invention are:

Arbitration

Request

Error

Snoop

Response

Data

Figure 3:
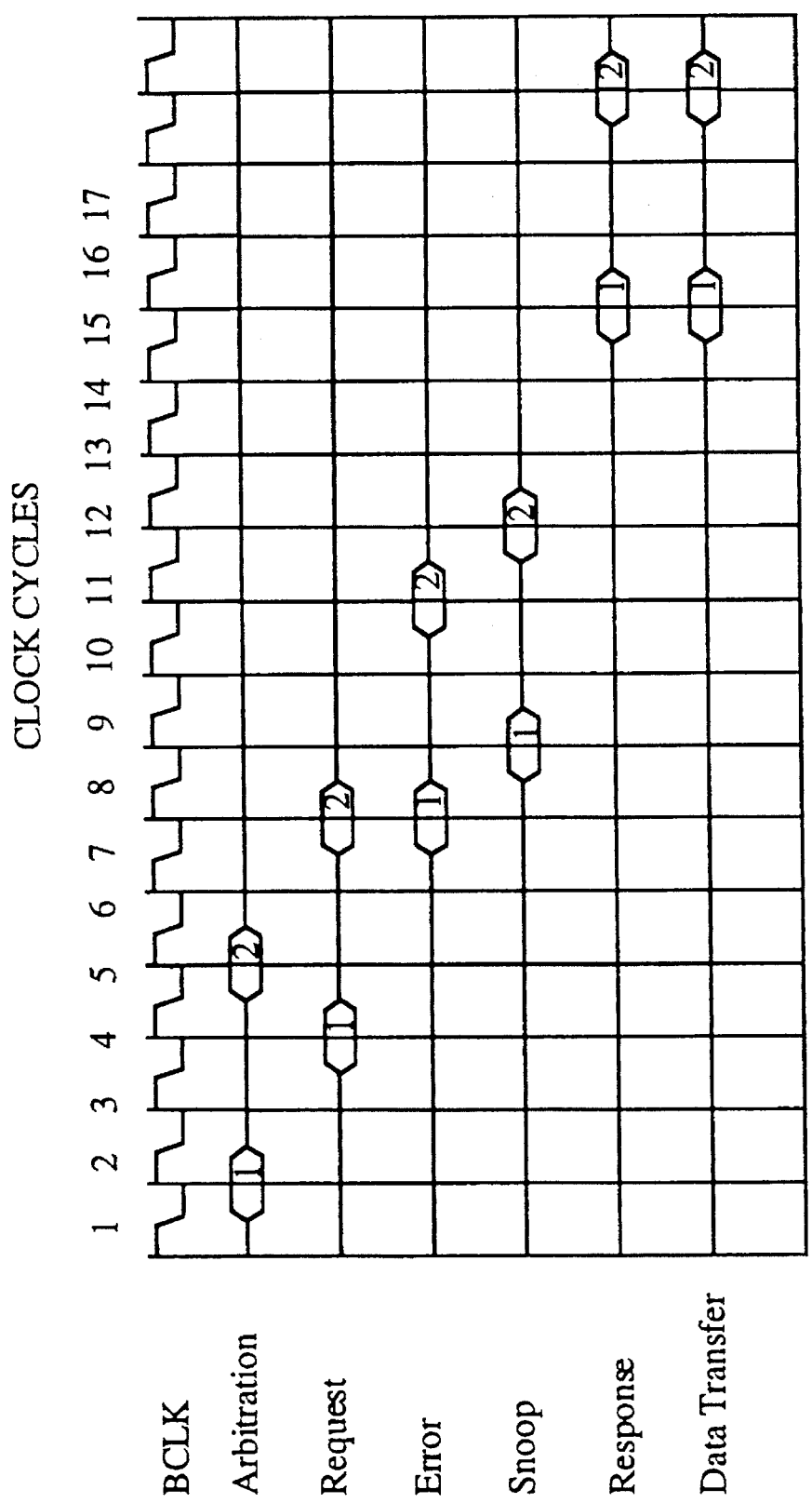
FIG. 3 is a timing diagram in which the transaction phases for two external bus transactions having data transfers is depicted.

With reference to FIG. 3, the bus transaction phases for two transactions having data transfers is depicted. When a requesting agent does not own the bus, a transaction begins with an arbitration phase in which the requesting agent becomes the bus owner. After the requesting agent becomes the bus owner, the transaction enters the request phase wherein the bus owner drives request and address information on the bus. The request state is two clocks long. In the first clock, the signal ADS# is driven along with the transaction address and sufficient information to begin snooping a memory access. In the second clock, more information such as byte enable information, deferred ID information and information concerning the length of the transaction are also driven.

Every transaction's third phase is an error phase, which occurs three clocks after the request phase begins. The error phase indicates any parity errors triggered by the request. Every transaction that is not canceled because an error was indicated in the error phase has a snoop phase four or more clocks after the request phase. The snoop results reported back to the EBCTL, EBMRS and EBBQ indicate if the address driven for a transaction references a valid or modified (dirty) cache line in any bus agent's cache in addition to whether a transaction is likely to be completed in-order with respect to previously issued transactions, be canceled and retried at a later time, or be deferred for possible out-of-order completion (when coupled to a processor that allows out-of-order completion of transaction requests on the bus).

Each transaction further has a response phase when the transaction is not canceled due to an error indicated in the error phase. During the response phase, the external bus agents report to the EBCTL information indicating whether the transaction has succeeded or failed (due to a hard error), whether the transaction is guaranteed to complete in order, whether the transaction's completion must be temporarily deferred, whether the transaction will be retried and whether the transaction contains a data phase. If the transaction does not have a data phase, that transaction is complete after the response phase. However, if the requesting agent has write data to transfer, or has requested read data, the transaction enters the data phase which may extend beyond the response phase.

Referring again to FIG. 2, the external bus logic comprises four major functional units: the external bus request queue (EBBQ), the microrequest sequencer (EBMRS), the external bus protocol control logic (EBCTL) and the external bus pad logic (EBPADS). The EBBQ is responsible for processing transaction requests from the DCU and the instruction fetch unit (IFU). It delivers to the BBL those requests that require L2 service and forwards those that the L2 cannot process successfully (i.e., L2 cache miss) to the external bus. Hence, the EBBQ can be viewed as the transaction scheduler for the EBL/BBL units. The EBMRS provides support for misaligned data as required by backward compatibility. It examines requests from the EBBQ to determine if a request crosses a bus width boundary. If a bus width crossing is detected, the EBMRS splits the single request from the EBBQ into two separate "split requests" and sequences them to the EBCTL. If the request is not misaligned, only a single request is presented to the EBCTL. The EBMRS is also responsible for generating the correct byte enables, cacheability attributes and deferred ID for external bus requests.

The EBCTL interfaces the microprocessor(s) to the external world and implements the external bus protocol. It is responsible for forwarding EBBQ/EBMRS requests to the external bus, informing the EBMRS and EBBQ of external request activity, transferring requested data between the BBL/DCU/L2 and the external bus, and tracking the status of all outstanding requests on the bus. Finally, the EBPADS contains the external bus I/O latches, the IEEE 1149.1 boundary scan cells and functional redundancy check logic.

With reference to FIGS. 2 and 3, an overview of the operation of the EBL units in processing transaction requests will be described below. Transaction requests are sent to the EBL by the IFU and DCU. Requests are processed and acknowledged by the EBBQ. The EBBQ forwards request to the BBL and the external bus based on the cacheability of the request type and whether or not the requested cache line is contained in the L2 cache. Requests which are non cacheable or have resulted in an L2 miss are forwarded to the EBMRS which handles misaligned bus accesses by splitting them into two aligned requests. The EBMRS forwards all requests including split requests to the EBCTL which implements the external bus protocol and sends the request to the external bus. The EBCTL tracks all bus requests and sends information regarding them to the other blocks of the EBL. All information flowing between the EBL and the external bus is latched by the EBPADS. When the response time of a transaction occurs, EBCTL takes care of sending the data to or from the processor core and informs the EBBQ when the transaction can be deallocated.

In performing read transactions, the EBL first sends a read request to the BBL for L2 processing. The BBL notifies the EBL whether the request resulted in an L2 hit or miss. If the request resulted in an L2 hit, the data is immediately returned to the DCU/IFU. In the event of an L2 miss, EBL sends an internal request for the transaction. If the microprocessor does not have control of the address (request) bus, EBL will arbitrate for the bus. If the microprocessor already has control of the bus, EBL will issue the request to the bus without entering arbitration. The EBL may have to assert the internal request for one or more cycles until the microprocessor actually arbitrates for and/or sends the request to the bus. If a request error is reported on the bus at this time, then the request is canceled and retried at a later time. Otherwise, the read transaction proceeds to the snoop phase where the owner of the data transfer is determined and snoop results, such as a cache hit signal and a defer signal, are reported to the other units. If necessary, the microprocessor bus protocol allows for the snoop phase to be stalled by any microprocessor bus agent.

Once the data transfer owner has been determined, the response agent (typically the addressed bus agent) drives response information for the request to the EBCTL indicating whether the transaction will be completed in order with respect to previously issued transaction requests, have its completion deferred without retrying the transaction or have its completion deferred until the transaction is retried. If a "normal" response is received, one or four —64 bit data chunks are returned on the bus and forwarded to the BBL/DCU/IFU. If a "defer" response is given, the response agent must later complete the transaction as a deferred reply transaction which may cause it to complete out-of-order. If a "retry" response is received another internal request for the transaction is transmitted by the EBL, and the transaction is retried on the external bus. If an "error" response is received, the transaction does not proceed beyond the response phase as it is typically canceled. Once all data chunks have been received, a transaction complete signal is sent to the BBL/DCU/IFU to end the transaction.

For write transactions to the external bus, the operation of the EBL is similar to that for read transactions except that data is retrieved from the BBL/DCU rather than sent to it. Also write transactions have a split response phase where the first part of the response initiates the data transfer and the second part of the response completes the transaction. Notice that the first part of the response can happen concurrently with the request error phase. However, transaction cannot complete until the microprocessor transfers all the write data onto the external bus and the final response is given by the response agent.

III. Global Observation of Transaction Completion

In highly pipelined bus architectures where bus transactions are allowed to complete out of order due to resource constraints or error conditions, it is desirable to provide a mechanism for informing bus agents when a particular transaction will be guaranteed in order completion so as to maintain memory consistency and avoid a shortage of resources. In the preferred embodiment, this is accomplished by defining in the microprocessor's external bus protocol a synchronizing (or memory ordering) event called "global observation." This event is an agreed upon point at which an agent responding to a transaction reports to other bus agents participating in the transaction and to the EBCTL that the transaction is guaranteed to complete in-order with respect to other previously issued transaction requests (i.e., will not be retried or deferred), thereby allowing the requesting agent to proceed with other order dependent transactions.

Upon issuance of a request for a transaction on the bus, all agents which may participate in the transaction must inform all other bus agents (in order) as to whether or not the specific actions requested by a transaction will be completed in-order. During the snoop phase of the transaction, ownership of the data transfer is determined and completion information for the outstanding transaction is collected from the external bus agents and reported to the EBCTL. The completion information sent to the EBCTL comprises a cache hit signal indicating whether the data has been found to reside with a particular bus agent and a defer signal indicating whether the transaction may be deferred due to a resource constraint or retried due to an error condition.

The EBCTL samples these signals to determine whether the transaction can be guaranteed to complete (in order) at this time. If the defer signal is not asserted, this indicates that the transaction request can be satisfied immediately, and hence, that the transaction's completion is guaranteed. If the defer signal is asserted, then one of two cases may result: If the cache hit signal is also asserted, then completion of the transaction can still be guaranteed at this time since a bus agent having the desired data has been identified. However, if the cache hit signal is not asserted, then either the transaction's completion is deferred until the necessary resources are available, or the entire transaction is retried by reissuance of the request from the EBBQ depending upon the response information generated in the response phase.

If the transaction can be guaranteed to complete at this time, then the EBCTL transmits to each of the EBBQ and the EBMRS a global observation signal indicating that:

1) the cache state transition requested by the transaction has taken place.

2) the agent granting global observation has acquired or relinquished snoop ownership of the transaction.

3) data will be transferred (if applicable).

4) a normal completion response (barring a hard error) will be sent for the transaction, thereby allowing it to complete in-order.

In this manner, both the EBBQ and the EBMRS can continue with other order dependent transactions upon receiving global observation for the previously issued, outstanding transaction. If, however, completion of a particular transaction cannot be guaranteed during this phase, then the EBBQ and EBMRS must wait until they receive either a retry response (meaning that the transaction will be canceled and later re-issued by the bus queue) or a deferred response (meaning that the transaction will complete sometime later and possibly out-of-order) in order to proceed with further transactions.

IV. The External Bus Request Queue (EBBQ)

The EBBQ is a centralized queuing structure that collects bus access requests from the IFU and DCU, then schedules those requests for in-order issuance to the L2 and external bus. It tracks the status of all requests from the L1 cache from the moment they are accepted until the final completion handshake back to the caches. This tracking allows the bus queue to correctly sequence requests and handle external snoops to requests that are in progress.

When a request requires external bus service, the EBBQ will issue a request to the EBCTL via the EBMRS. Together they implement the mechanisms for generating, sequencing and tracking requests on the external bus. To send a request, the EBBQ asserts a request indication and drives the address and request attributes. In request terminology, driving of the address pins is broken into two different cycles; the cycle during which ADS# is active is referred to as a first ADS# cycle, while the cycle after ADS# was active is referred to as a second ADS# cycle.

Within the EBBQ, the order of selection of pending requests for issuance onto the external bus is made by a pointer rotating between the different EBBQ entries, with the EBBQ having four entries in the preferred embodiment. When the pointer points to a valid queue entry, it is presented to the EBMRS/EBCTL as described above. The pointer stays there, and hence the request stays presented, until the acknowledgment is received. When rotating, the pointer advances one queue entry per clock cycle.

Once a request is presented to the external bus by the EBBQ, it will not be changed until an acknowledgment is received from the external bus. This will occur after the second ADS# cycle has been driven onto the bus for normal requests, and after the second ADS# cycle of the last of two split requests has been driven onto the bus in the case of a partial operation which resulted in a split transaction.

In the completion phase, the external bus reports the completion of a request on the external bus. There are two distinct completion signals generated by the EBCTL because two separate requests may need to be completed in the same cycle. The complete signals are accompanied by a bus queue index, as well as the buffer id which was passed to the EBCTL when the request was issued. In addition to those requests which reside in the EBBQ, the EBBQ may receive a complete indication for a buffer which is being used for an implicit writeback, and as such may not have a corresponding entry in a queue.

The EBBQ has a private Completion path back to the DCU and shares a common completion path back to the IFU. In both cases, the EBBQ will signal Completion to the L1 cache when it has received Completion from the external bus, and has already forwarded all of the chunks received from the external bus, to the corresponding L1 cache. Each completion signal is accompanied by an error indication, which is asserted in the case that a Hard Error or Double Parity Error occurred while issuing the request onto the bus. The receiving L1 cache in these instances is required to take the appropriate error recovery actions.

V. The External Bus Micro Request Sequencer (EBMRS)

The EBMRS is the interface between the EBBQ and the EBCTL for handling the sequencing of split and lock transactions to the external bus. All core requests to the EBBQ that cannot be satisfied by the L2 via the BBL are presented to the EBMRS for service on the external bus. The EBMRS examines these requests (i.e., a "split field" of the request) to determine if it is a split transaction (i.e., partial reads and writes that cross 64 bit cache line chunk boundaries) and makes a request to the EBCTL for service.

If no split transaction is detected, the EBMRS translates the request from internal microprocessor format to the format of the external bus before passing it to the EBCTL. If a split transaction is detected the EBMRS dynamically translates the EBBQ's internal request and sequences this request into multiple "split requests" on the external bus such that each split request appears as a single external bus transaction and is contained entirely within a cache line. This includes a calculation of the appropriate byte enables for each split request and tracking the entire life of the split request up to a global observation phase where it is then determined whether or not the split request will be completed in order with respect to its issuance from the EBBQ. Some EBCTL signals associated with the requests' life on the bus are directly sent to the EBBQ (e.g., transaction completion signals), whereas other information is routed through the EBMRS (e.g., global observation, acknowledgment, etc.).

The EBMRS decodes the EBBQ's core request to determine the external bus transaction type. This information is used to drive the REQ# pins which encode the request type and accompany every ADS# on the external bus. The EBBQ presents requests to the EBMRS via a request signal, an encoded request type, the transaction address and length, and any request attributes. The request type and attributes allows the EBMRS to completely specify the entire two cycle external bus request encoding, which appear on the REQ# and A3# pins during and the clock after an ADS# for microprocessor issued transactions.

The EBBQ makes a request to the EBMRS for external bus service when it has determined that the BBL cannot service the request at hand. Certain requests are first presented to the BBL to see if they can be satisfied there, whereas others are directly presented to the EBMRS for issuance onto the external bus. After the EBMRS has formed all the request attributes, it makes a request to the EBCTL for an external bus transaction. When this request is made to EBCTL, the corresponding address and request pin information is checked for parity errors and then sent to the EBPADS with an ADS# for driving of the request on the external bus. A special signal is sent to EBCTL if the current request is a bus lock, and will require assertion of the LOCK# pin per the bus protocol. The EBMRS also informs EBCTL whether or not each request is a cache line or a partial request, and whether or not EBCTL should send a complete signal to the EBBQ upon completion of this transaction.

There are several types of requests that the core makes to the EBBQ, and several types that the EBBQ presents to the EBMRS, including Read, Read for Ownership, Locked Read for Ownership, Invalid to Modified, Write Back, Write Combining Chunk Eviction, Write Combining Line Eviction, Partial Read, Partial Write, IO Read, IO Write, Locked Partial Read, Split Locked Partial Read, Locked Partial Write, Special Cycle, Interrupt Acknowledge, and Branch Trace Message transactions. However, these external bus transactions can be more broadly classified into reads and writes (line or partial or I/O), code reads, invalidates, Interrupt Acknowledge, Branch Trace Message, and various "Special Bus Cycles". As mentioned above, each of these external bus transactions consist of an ADS# accompanied by two consecutive clocks of request information on the address bus A# and the request pins REQ#.

VI. Split Transaction Sequencing

From the perspective of the external bus, a misaligned bus transaction is a transaction whose address/length combination crosses an aligned chunk boundary and the bus ordering protocol (i.e., the processor line transfer ordering) does not match the cache line transfer ordering of the memory subsystem. The DCU can issue partial read/write transactions (locked or not) with an address and length combination such that the single DCU transaction will require bytes from two separate 8 byte chunks which may be non-contiguous with respect to the bus ordering protocol. Since the data bus is 8 bytes wide, the external bus must sequence such transactions as two separate requests, each of which returns one 8 byte chunk of data with the appropriate byte enables set for each. It is the EBMRS' responsibility for sequencing such transactions to the EBCTL in the proper fashion. Because a single DCU transaction can result in two bus transactions, special care must be taken to closely track the progress of each split request forming an entire split transaction. The EBMRS receives global observation, error and defer/retry/hard failure response information for each split request from EBCTL.

The EBBQ determines whether a given transaction is a split transaction or not by checking to see if the number of bytes requested by the DCU crosses a chunk boundary when added to the transaction address. This information is conveyed to the EBMRS by means of the EBBQ setting a bit in the split field of the request in addition to asserting the EBBQ's request line. Alternatively, the EBMRS could itself determine whether a split transaction is required by checking the number of bytes which cross a chunk boundary so as to relieve the EBBQ of this responsibility. The EBMRS is then responsible for splitting the transaction into two separate "split" requests (each with an 8 byte aligned address) and for setting the appropriate address and byte enable information for each. Additionally, the EBMRS receives global observation information from the EBCTL, which tells the EBMRS when it is safe to initiate the second split request, while assorted error information is also communicated to the EBMRS from the EBCTL.

Although in the preferred embodiment it is assumed that an internal (or microprocessor) request comprises a request for an 32 byte data cache line, and hence, that a split transaction will be split into only two split requests, it is envisioned that the internal transaction request may actually cross more than one cache line boundary of the memory subsystem (depending upon the units of transfer on the bus and the data sizes supported by the processor) and therefore require separation into more than two split requests. Accordingly, the present invention may be adapted to encompass this situation by providing logic in either the EBBQ or the EBMRS which compares the number of bytes in the transaction request to the standard data cache line width of the memory subsystem and determines the number of cache line boundaries that the transaction request will cross when added to the transaction address.

Split sequencing begins when EBCTL accepts the first of two split requests, and ends when the second split request has passed its global observation window during the snoop phase of the transaction. The EBMRS keeps track of which split request is in progress, and reports global observation on a split request to the EBBQ only when the second split request has passed its global observation window. As the EBBQ does not track the progress of each individual split request, the EBMRS must inform EBCTL whether or not to send a complete signal to the EBBQ with each split request. This is because a complete signal for all transactions is sent directly to the EBBQ from EBCTL. (Unlike, for example, global observation, and acknowledge signals, which are routed through the EBMRS.) The Send Complete signal accompanies all normal transactions made by the EBMRS to EBCTL, but for split transactions, it is deasserted on the first split request of the split transaction so the transaction is not de-allocated before the second split request is complete.

Figure 4:
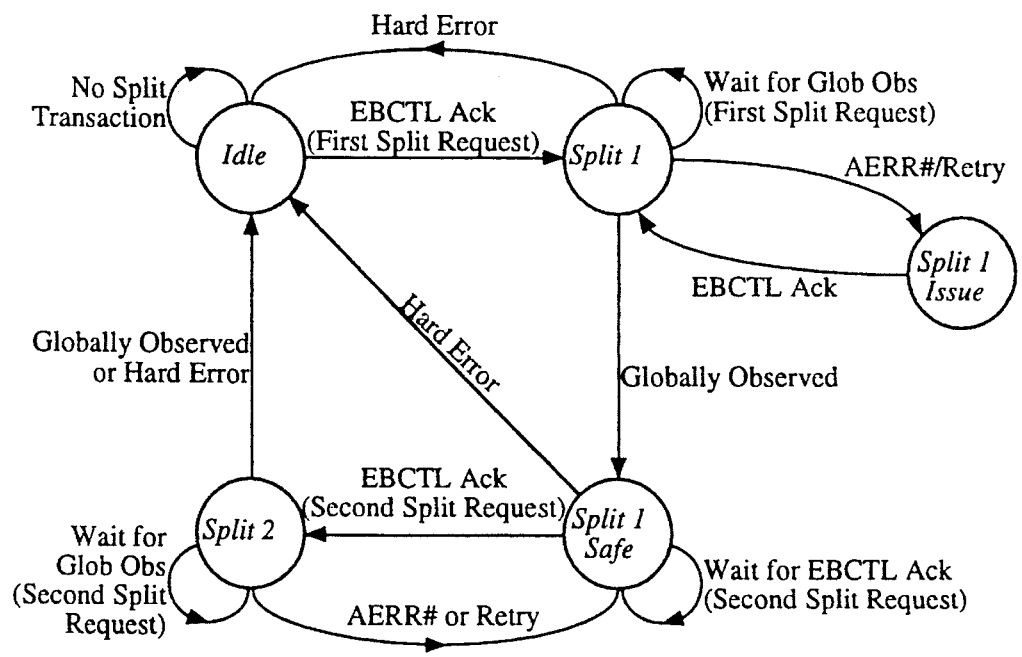
FIG. 4 is a state diagram for split transaction sequencing performed by the finite state machine of the micro-request sequencer.

The EBMRS contains special sequencing logic to track the progress of each split request as is shown in the state diagram of FIG. 4. In the Idle state, information regarding all transactions is passed directly back to the EBBQ from the EBCTL. The split sequencing begins when the first split request of a split transaction is accepted by the EBCTL (Split 1 state). The EBMRS remains in this state until the EBCTL samples the appropriate signals and reports global observation for this first split request to the EBMRS. If an address request error or retry response is received by the EBMRS, it will retry the first split request once more (Split 1 Issue state). A receipt of a hard error while in any active split sequencing state will result in an immediate return to the Idle state and canceling of the entire split transaction.

Upon receipt of global observation for the first split request, the EBMRS enters the Split 1 Safe state and then issues the second split request to the EBCTL. When the second split request is acknowledged by the EBCTL, the Split 2 state is entered. If an address request error or retry response is received for the second split request, the EBMRS will return to the Split 1 Safe state and reissue the second split request. The EBMRS then returns to the Idle state when global observation is received for the second split request. In this manner, the reporting of global observation from the EBCTL to the EBMRS is utilized to determine when in-order completion of both the first and second split requests is guaranteed so that issuance of the second split request or a subsequent transaction, respectfully, can be performed without jeopardizing the order dependency of the transactions.

It is noted that if more than two split requests were required by a split transaction that crosses more than one data chunk boundary, the split sequencing shown in the state diagram of FIG. 4 would have to be extended to include (after the split 2 state) a split 2 safe state and a split 3 state, etc., with appropriate returns provided to the idle state and the split 2 safe state upon receiving a hard error or either an address request error or retry, respectively. With such an extension, global observation would still be reported for each preceding split request before the succeeding split request is issued to the EBCTL.

According to an alternate embodiment, it is not necessary to wait for global observation to be reported by the EBCTL before issuing each split request of a split transaction. In this embodiment, the EBMRS would keep a "scoreboard" of small registers to track the status of each split request since the ordering of the completion of the split requests cannot be guaranteed. Again, this mechanism could be extended to accommodate bus transactions which are broken into more than 2 split requests.

VII. Locked Transaction Sequencing

Locked bus transaction sequences (typically consisting of at least one partial read followed by the same number of partial writes) require special handling by the EBBQ because of the need for strict sequencing of the transactions to the external bus for system compatibility. To accomplish this, the EBBQ enters a mode in which it first drains itself of all previously existing requests, and then steps one by one through a sequence of locked bus transactions upon locking of the bus for exclusive use by the microprocessor. In order to indicate the start of a locked sequence to the EBL units, the first partial read transaction should be of the lock or split lock variety, whereas to indicate the end of the lock sequence, the last partial write transaction should be of the unlock or "split" unlock variety.

When a lock read request is presented to the EBBQ, all outstanding requests are completed, and the lock request is accepted by the EBBQ. The EBBQ continues accepting locked requests until an unlock write request is received and accepted, after which the queue is drained and the request acceptance policy is returned to normal. During lock processing, new DCU requests can be accepted in the normal, lock request acceptance and DCU acceptance states, while new IFU requests can only be accepted in the normal state.

Since the EBMRS contains intimate knowledge of split requests, it is efficient for the EBMRS to handle lock sequencing because the microprocessor bus lock protocol does not match exactly with the lock protocol emanating from the memory system. Therefore, the EBMRS is responsible for tracking all transactions that will be issued on the external bus with the LOCK# pin asserted. Lock and unlock requests are identified by the EBMRS by detecting certain bits of the EBBQ's request type, including DCU lock partial reads and unlock partial writes. In addition, the special DCU split lock read transaction is also supported. This is issued by the DCU when a given transaction crosses a cache line boundary, but remains within a chunk boundary. Read-modify-write sequences consist of lock partial read transactions followed by unlock write transactions from the DCU. This ensures that the bus does not hang due to the LOCK# pin being asserted indefinitely.

Legal DCU read-modify-write sequences could include a locked partial read followed by a locked partial write request. In this case, the lock variable may result in a (chunk) split access on the bus. This means that there can be at most four consecutive ADS# cycles corresponding to two locked partial reads and two locked partial writes on the bus. In the absence of an error, the LOCK# pin will stay asserted from the time the first ADS# was asserted, until at least the response phase of the last locked transaction. It is noted that locked transactions cannot receive a deferred response (except where the transaction is the first transaction of a locked sequence, in which case, such a response will cause the entire lock sequence to be aborted).

Figure 5:
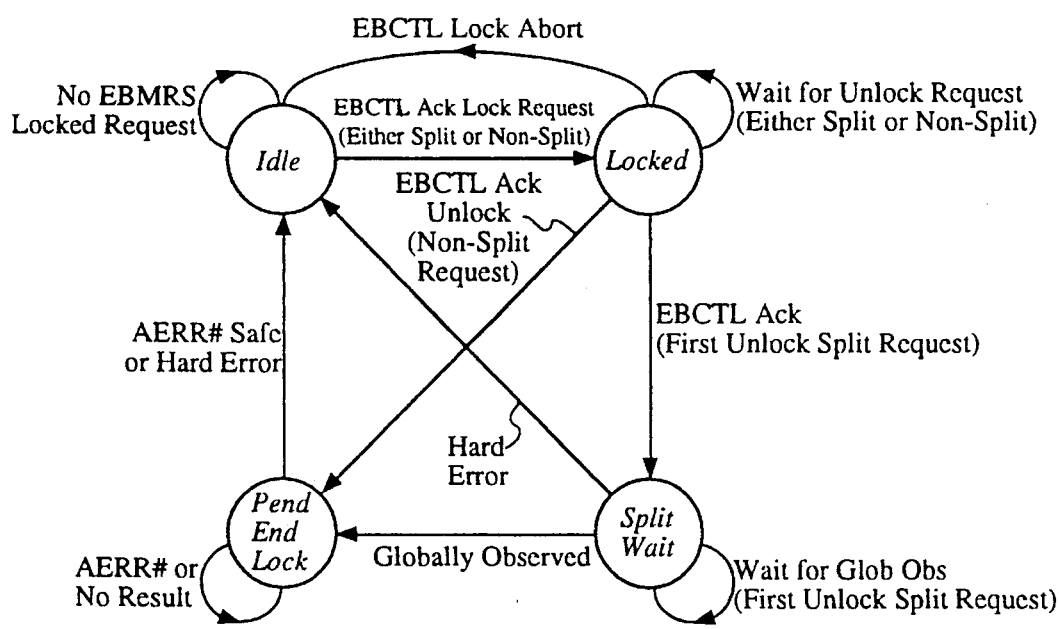
FIG. 5 is a state diagram for split and non-split locked transaction sequencing performed by the finite state machine of the micro-request sequencer.

With reference to the sequencing of locked bus transactions performed by the EBMRS, as shown in the state diagram of FIG. 5, the EBMRS normally resides in the idle state. If a lock request is received from the EBBQ, the EBMRS issues the request to the EBCTL and instructs it to lock the bus. If the lock transaction is of the split variety, the EBMRS handles it as a normal split transaction by separating it into two split requests and processing it according to the state diagram of FIG. 4. Nonetheless, the EBMRS instructs the EBCTL to lock the bus upon the issuance of the first split request. The EBCTL proceeds to lock the bus, and upon acknowledging the lock request (either split or non-split) to the EBMRS, the Locked state of the EBMRS's state machine is entered. The EBCTL continues to lock the bus until instructed to unlock it by EBMRS.

The EBMRS remains in the Locked state during processing of the subsequent locked bus requests until an unlock request (either split or non-split) is issued from the EBBQ or a lock abort signal (lock error or restart) is reported by the EBCTL. When an unlock transaction is received from the EBBQ, the EBMRS checks to see whether it is a split or non-split transaction. If it is a non-split transaction, the EBCTL is instructed to unlock the bus upon issuance of the request to the EBCTL. However, if it is a split transaction, the EBMRS separates it into two split requests and issues the first split request to the EBCTL without instructing the EBCTL to unlock the bus. Accordingly, the state machine of the EBMRS can enter one of two states once the unlock request is accepted by the EBCTL. If the unlock request is a non-split request, the EBMRS will enter the Pend End Lock state upon receiving acknowledgment from the EBCTL for the request. If the unlock request is the first part of a split unlock transaction, the Split Wait state is entered upon acknowledgment of the first split unlock request. Upon reporting of global observation of the first split unlock request from the EBCTL to the EBMRS, the EBMRS enters the Pend End Lock state where the second unlock split request is issued to the EBCTL. The EBMRS also instructs the EBCTL to unlock the bus upon issuance of the second split request, however, the EBCTL does not actually unlock the bus until the second unlock split has safely passed through its response phase without errors as indicated by the response information returned from the bus agents. Note that if the first split unlock request had resulted in a hard error, then the entire lock sequence would be aborted, returning the state machine of the EBMRS to the idle state.

The Pend End Lock state is the final state before the lock cycle is forgotten by the EBMRS. Once having entered the Pend End Lock state, the EBMRS remains in this state until the final unlock request (split or non-split) has safely passed through its request error phase (the earliest that the bus can be unlocked). Upon receipt of response information from the EBCTL regarding safe passage of the transaction through its request error phase (or a hard failure response) for the final unlock request, the EBMRS exits the lock cycle and returns to the Idle state. If a request error is received for the transaction (split or non-split) in the Pend End Lock state, the transaction is retried on the bus with a reaffirmation to the EBCTL that the bus should be unlocked.

In an alternate embodiment, the EBMRS can issue to the EBCTL the second unlock split request for a split transaction while in the Split Wait state as soon as the first unlock split request has been globally observed. The transition to the Pend End Lock state is then made after the final split unlock request has been acknowledged by the EBCTL. This therefore makes the state transitions into the Pend End Lock state more symmetric and further enables the Pend End Lock state to perform a single function regardless of whether the transaction is split or not.

Note that blocking of EBBQ requests to the EBCTL by the EBMRS is related to split sequencing only. The EBMRS acts as a passive device for normal locked requests (only instructing the EBCTL when to lock and unlock the bus). Although split sequencing can take place within a locked sequence, and may have an effect on the lock sequence state, the locked state does not directly cause the EBMRS to affect the communication between the EBCTL and bus scheduling queue.

VIII. Computer System

As mentioned earlier, the present invention described above can be implemented in an out-of-order microprocessor or in more conventional pipelined and non-pipelined microprocessors. Regardless of the type of processor in which the invention is used, the processor selected may be added to a general purpose computer system as shown in FIG. 6.

Such a computer system comprises an address/data bus 1000 for communicating information, a central processor 1002 coupled with the bus for processing information and executing instructions, a random access memory 1004 coupled with the bus 1000 for storing information and instructions for the central processor 1002, and a read only memory 1006 coupled with the bus 1000 for storing static information and instructions for the processor 1002. Also available for interface with the computer system of the present invention is a data storage device 1008 such as a magnetic disk or optical disk drive, which may be communicatively coupled with the bus 1000, for storing data and instructions.

The display device 1010 utilized with the computer system of the present invention may be a liquid crystal device, cathode ray tube, or other display device suitable for creating graphic images and/or alphanumeric characters recognizable to the user. The computer system may also contain an alphanumeric input device 1012 including alphanumeric and function keys coupled to the bus 1000 for communicating information and command selections to the central processor 1002, and a cursor control device 1014 coupled to the bus 1000 for communicating user input information and command selections to the central processor 1002 based on a user's hand movement.

Figure 6:
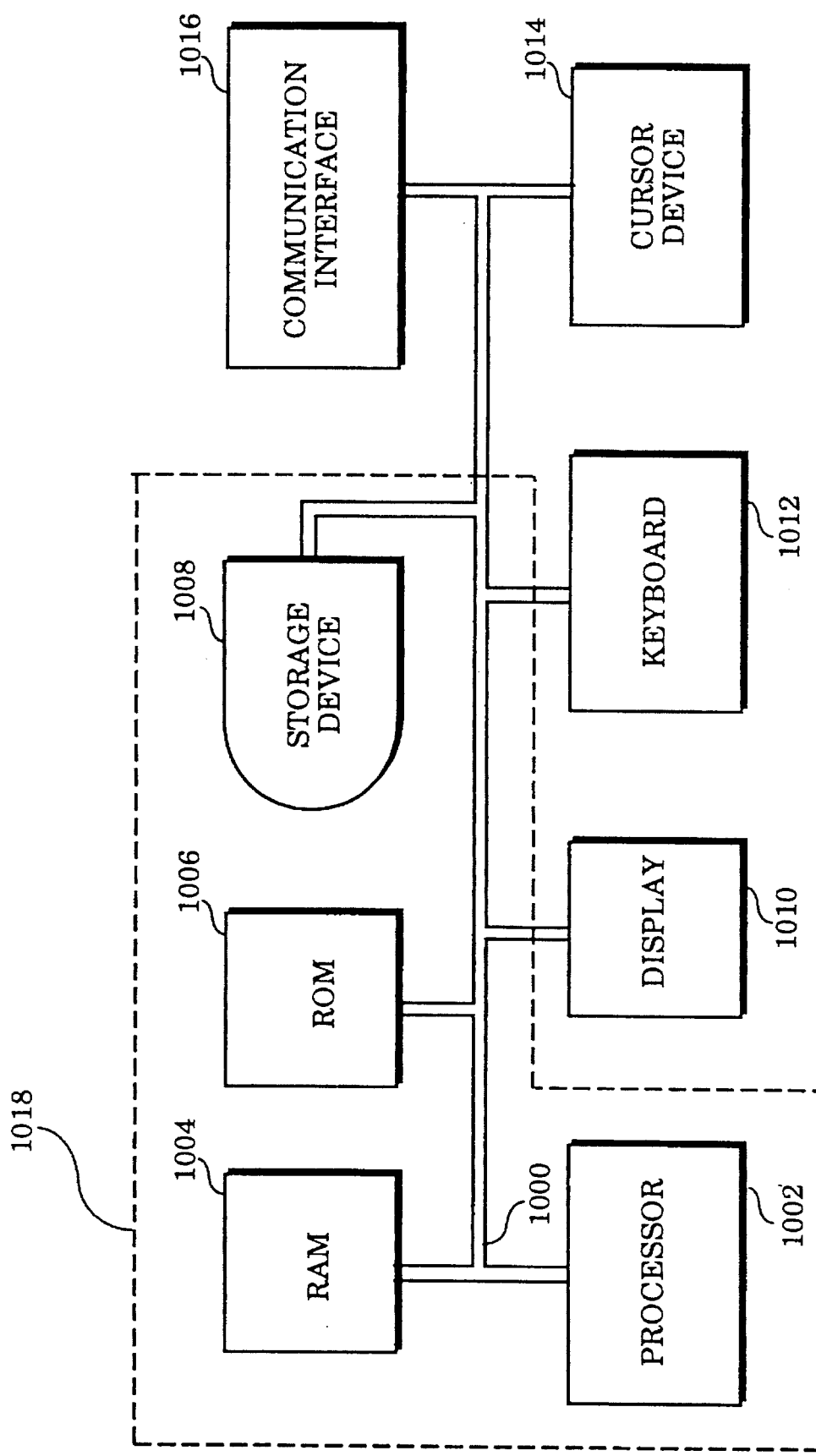
FIG. 6 is a block diagram of one embodiment of a computer system in which a microprocessor utilizing the present invention may be implemented.

The computer system of FIG. 6 also contains an input/output device 1016 coupled to the bus 1000 for communicating information to and from the commuter system. The communication device 1016 may be composed of a serial or parallel communication port or may be a communication modem. It is appreciated that such a communication device 1016 may provide an interface between the bus 1000 and the user interface devices (keyboard 1012, cursor 1014, display 1010) of the computer system. In this case, the user interface devices will reside within a terminal device which is coupled to the communication device 1016 so that the processor 1002, the RAM 1004, the ROM 1006 and storage device 1008 may communicate with the terminal. The components 1002, 1004, 1006 and 1008 may be implemented on a single board or a computer chassis 1018, which is then coupled by a bus 1000 to the other components of the computer system.

It will be appreciated that various modifications and alterations might be made by those skilled in the art without departing from the spirit and scope of the present invention. Therefore, the invention should be measured in terms of the claims which follow.

We claim:

1. In a microprocessor having an associated bus interface unit with control logic for coupling the microprocessor to an external bus and processing external bus transaction requests on the external bus, a method is provided for sequencing misaligned bus transaction requests on the external bus, each of said misaligned bus transaction request forming a memory access crossing a data bus width boundary of the external bus, the method comprising the steps of:

said bus interface unit of said microprocessor separating each misaligned bus transaction request into at least first and second split transaction requests, with each split request forming a memory access that does not cross a data bus width boundary of the external bus;

issuing the first split request to the control logic of the bus interface unit for processing of the first split request on the external bus;

determining whether a global observation has been issued for said first split request;

in response to said global observation of said first split request issuing the second split request to the control logic of the bus interface unit for processing of the second split request on the external bus;

determining whether a global observation has been issued for said second split request; and in response to said global observation of said second split request, completing processing of the second split request on the external bus in order with respect to issuance of the first split request.

2. The method of claim 1, wherein the bus interface unit further comprises a bus queue for buffering and issuing requests and a transaction request sequencer for sequencing the requests received from the bus queue to the control logic, and before the step of separating each misaligned bus transaction request into at least first and second split transaction requests, the method further comprises the steps of:

transmitting external bus transaction requests from a requesting unit of the microprocessor to the bus queue;

issuing the bus transaction requests from the bus queue to the transaction request sequencer; and identifying bus transaction requests which cross a data bus width boundary of the external bus as misaligned bus transaction requests.

3. The method of claim 2, wherein the steps of determining whether the global observation of said first split request has been issued and issuing the second split request to the control logic of the bus interface unit in response to said global observation is performed by the steps of:

transmitting said global observation from bus agents coupled to the external bus to the control logic of the bus interface unit, the global observation indicating whether the first split transaction request will complete without being deferred or retried;

transmitting a first completion guarantee signal from the control logic to the sequencer when the first response information indicates that the first split transaction request is guaranteed to complete without being deferred or retried; and issuing the second split request from the sequencer to the control logic of the bus interface unit for processing of the second split request on the external bus when the first completion guarantee signal for the first split request is received by the sequencer from the control logic.

4. The method of claim 2, wherein the steps of determining whether the global observation of said second split request has been issued and completing processing of the second split request on the external bus in order with respect to issuance of the first split request in response to said global observation of said second split request is performed by the steps of:

transmitting said global observation from bus agents coupled to the external bus to the control logic of the bus interface unit, the global observation indicating whether the second split transaction request is guaranteed to complete without being deferred or retried;

transmitting a second completion guarantee signal from the control logic to the sequencer when the second response information indicates that the second split transaction request is guaranteed to complete without being deferred or retried; and completing processing of the second split request on the external bus when the second completion guarantee signal for the second split request is received by the sequencer from the control logic.

5. The method of claim 2, wherein the step of identifying bus transaction requests which cross a data bus width boundary of the external bus as misaligned bus transaction requests is performed by one of the bus queue and the sequencer.

6. The method of claim 1, wherein the method further comprises the step of canceling the misaligned bus transaction request upon the occurrence of a hard error.

7. In a microprocessor having an associated bus interface unit with control logic for transferring data between the microprocessor and external bus agents via an external bus, a method is provided for sequencing misaligned bus transaction requests on the external bus, each said misaligned bus transaction request forming a memory access crossing a data bus width boundary of the external bus, the method comprising the steps of:

transmitting external bus transaction requests generated by the microprocessor to the bus interface unit;

determining whether the data to be transferred in each external bus transaction request will cross a data bus width boundary of the external bus;

said bus interface of said microprocessor separating each external bus transaction request denoted as a misaligned bus transaction request into at least first and second split transaction requests when the data to be transferred in the external bus transaction request will cross a data bus width boundary of the external bus, with each split request forming a memory access that does not cross a data bus width boundary of the external bus;

issuing the first split request of each misaligned bus transaction request to the control logic of the bus interface unit;

transmitting request and address information corresponding the first split request from the control logic to the bus agent specified by the address information to effect a transfer of data between the microprocessor and the addressed bus agent;

transmitting a first global observation from the bus agents to the control logic of the bus interface unit;

issuing the second split request to the control logic of the bus interface unit when the first global observation transmitted from the bus agents is received by said control logic;

transmitting a second global observation from the bus agents to the control logic of the bus interface unit; and completing processing of the second split request on the external bus in order with respect to issuance of the first split request when the second global observation is received by said control logic.

8. The method of claim 7, wherein for a misaligned bus transaction request comprising a bus lock transaction request of a sequence of locked transaction requests for which the external bus must be locked for exclusive use by the microprocessor in processing the sequence of locked transaction requests, the method further comprises the step of locking the external bus for exclusive use by the microprocessor upon issuance of the first split request of the misaligned bus lock transaction request to the control logic.

9. The method of claim 7, wherein for a misaligned bus transaction request comprising a bus unlock transaction request of a sequence of locked transaction requests for which the external bus must be locked for exclusive use by the microprocessor in processing of the sequence of locked transaction requests, the method further comprises the step of unlocking the external bus to enable use of the external bus by other bus agents when the second global observation for the second split request is received from the external bus agents.

10. The method of claim 7, wherein the method further comprises the step of canceling the misaligned bus transaction request upon the occurrence of a hard error.

11. In an out-of-order microprocessor comprising an instruction fetch unit, a data cache unit and an associated bus interface unit for transferring data between one of the instruction fetch unit and the data cache unit and external bus agents via an external bus, a method is provided for sequencing misaligned bus transaction requests on the external bus, each misaligned bus transaction request forming a memory access crossing a data bus width boundary of the external bus, the bus interface unit having control logic capable of processing external bus transaction requests in order of receipt from the instruction fetch unit and the data cache unit, the method comprising the steps of:

A) transmitting external bus transaction requests from one of the instruction fetch unit and the data cache unit to a bus queue of the bus interface unit for buffering of the bus transaction requests;

B) issuing the bus transaction requests from the bus queue to a transaction request sequencer of the bus interface unit;

C) identifying bus transaction requests which cross a data bus width boundary of the external bus as misaligned bus transaction requests;

D) separating each misaligned bus transaction request into at least first and second split transaction requests, with each split request forming a memory access that does not cross a data bus width boundary of the external bus;

E) issuing the first split request of the misaligned bus transaction request from the sequencer to the control logic of the bus interface unit for processing of the first split request on the external bus;

F) transmitting first response information from the bus agents coupled to the external bus to the control logic of the bus interface unit, the first response information indicating at least whether the first split transaction request will complete without being deferred or retried;

G) transmitting a first completion guarantee signal from the control logic to the sequencer when the first response information indicates that the first split transaction request is guaranteed to complete without being deferred or retried;

H) issuing the second split request from the sequencer to the control logic of the bus interface unit for processing of the second split request on the external bus when a first completion guarantee signal for the first split request is received by the sequencer from the control logic;

I) transmitting second response information from the bus agents to the control logic of the bus interface unit, the second response information indicating at least whether the second split transaction request is guaranteed to complete without being deferred or retried;

J) transmitting a second completion guarantee signal from the control logic to the sequencer when the second response information indicates that the second split transaction request is guaranteed to complete without being deferred or retried; and K) returning to step B) when the second completion guarantee signal for the second split request is received by the sequencer from the bus control logic.

12. The method of claim 11, wherein for a misaligned bus transaction request comprising a bus lock transaction request of a sequence of locked transaction requests for which the external bus must be locked for exclusive use by the microprocessor in processing the sequence of locked transaction requests, the method further comprises the step of locking the external bus for exclusive use by the microprocessor upon issuance of the first split request of the misaligned bus lock transaction request from the sequencer to the control logic.

13. The method of claim 11, wherein for a misaligned bus transaction request comprising a bus unlock transaction request of a sequence of locked transaction requests for which the external bus must be locked for exclusive use by the microprocessor in processing of the sequence of locked transaction requests, the method further comprises the step of unlocking the external bus to enable use of the external bus by other bus agents when the second response information for the second split request received from the external bus agents indicates that no errors have occurred in processing of the second split request.

14. The method of claim 11, wherein the step of identifying bus transaction requests which cross a data bus width boundary of the external bus as misaligned bus transaction requests is performed by one of the bus queue and the sequencer.

15. The method of claim 11, wherein the method further comprises the step of canceling the misaligned bus transaction request upon the occurrence of a hard error.

16. An apparatus for sequencing misaligned bus transaction requests between a microprocessor and external bus agents coupled together via an external bus, each said misaligned bus transaction request forming a memory access crossing a data bus width boundary of the external bus, the apparatus comprising:

a transaction request sequencer for receiving bus transaction requests from the microprocessor and identifying bus transaction requests which cross a data bus width boundary of the external bus as misaligned bus transaction requests, the sequencer separating each misaligned bus transaction request into at least first and second split transaction requests, with each split request forming a memory access that does not cross a data bus width boundary of the external bus;

control logic for receiving bus transaction requests from the sequencer and processing bus transaction requests on the external bus; and wherein in the case of a misaligned bus transaction request, the sequencer issues the first and second split requests in order to the control logic for driving of associated request and address information on the external bus to process the first and second requests, with the second split request being issued from the sequencer to the control logic only after receiving a first global observation for the first split request from external bus agents.

17. The apparatus of claim 16, wherein for a misaligned bus transaction request comprising a bus lock transaction request of a sequence of locked transaction requests for which the external bus must be locked for exclusive use by the microprocessor in processing the sequence of locked transaction requests, the external bus is locked for exclusive use by the microprocessor upon issuance of the first split request of the misaligned bus lock transaction request from the sequencer to the control logic.

18. The apparatus of claim 16, wherein for a misaligned bus transaction request comprising a bus unlock transaction request of a sequence of locked transaction requests for which the external bus must be locked for exclusive use by the microprocessor in processing of the sequence of locked transaction requests, the external bus is unlocked to enable use of the external bus by other bus agents when said second global observation for the second split request from the external bus agents is received by the control logic.

19. In a computer system having a microprocessor, an external bus for communicating with external bus agents comprising at least a memory means, and a bus interface unit having control logic for transferring data between the microprocessor and the external bus agents, an apparatus is provided for sequencing misaligned bus transaction requests between the microprocessor and the external bus agents, each said misaligned bus transaction request forming a memory access crossing a data bus width boundary of the external bus, the apparatus comprising:

a transaction request sequencer for receiving bus transaction requests from the microprocessor and identifying bus transaction requests which cross a data bus width boundary of the external bus as misaligned bus transaction requests, the sequencer separating each misaligned bus transaction request into at least first and second split transaction requests, with each split request forming a memory access that does not cross a data bus width boundary of the external bus;

control logic for processing bus transaction requests issued from the sequencer on the external bus; and wherein in the case of a misaligned bus transaction request, the sequencer issues the first and second split requests in order to the control logic for driving of associated request and address information on the external bus to process the first and second requests, with the second split request being issued from the sequencer to the control logic only after receiving a first global observation for the first split request from external bus agents.

20. The apparatus of claim 19, wherein the microprocessor comprises an out-of-order microprocessor having an execution unit for executing instructions out-of-order, a dispatch buffer for temporarily storing microinstructions until the execution unit is available and a reorder buffer for buffering instructions and corresponding execution results after instruction execution.

* * * * *

UNITED STATES PATENT AND TRADEMARK OFFICE
CERTIFICATE OF CORRECTION

PATENT NO. : 5,535,345
DATED : July 9, 1996
INVENTOR(S) : Fisch et al.

It is certified that error appears in the above-identified patent and that said Letters Patent is hereby corrected as shown below:

In column 4 at line 56 delete "trait" and insert --unit--

In column 15 at line 32 delete "request issuing the second split" and insert --request, issuing the second split--

Signed and Sealed this

Twenty-sixth Day of November 1996

Attest:

BRUCE LEHMAN

Attesting Officer

Commissioner of Patents and Trademarks